(12) United States Patent
Lee et al.

(10) Patent No.: US 11,815,270 B2
(45) Date of Patent: Nov. 14, 2023

(54) HEAT TRANSMITTING SYSTEM FOR PROVIDING A HEAT MEDIUM WITH A SET TEMPERATURE AND HEAT TRANSMITTING METHOD

(71) Applicant: KOREA INSTITUTE OF ENERGY RESEARCH, Daejeon (KR)

(72) Inventors: Dong Hyun Lee, Sejong-si (KR); Jaejoon Choi, Daejeon (KR); Duck Jae Wei, Busan (KR); Seongeun Kim, Cheonan-si (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 420 days.

(21) Appl. No.: 17/005,761

(22) Filed: Aug. 28, 2020

(65) Prior Publication Data
US 2021/0088228 A1   Mar. 25, 2021

(30) Foreign Application Priority Data

Sep. 19, 2019  (KR) .......................... 10-2019-0115588

(51) Int. Cl.
F24D 11/02   (2006.01)
F24D 19/00   (2006.01)
F03G 6/06    (2006.01)

(52) U.S. Cl.
CPC ...... *F24D 11/0207* (2013.01); *F24D 19/0075* (2013.01); *F03G 6/067* (2013.01); *F24D 2220/0271* (2013.01); *F24D 2220/042* (2013.01); *F24D 2220/08* (2013.01)

(58) Field of Classification Search
USPC ........................................... 165/10
See application file for complete search history.

(56) References Cited

U.S. PATENT DOCUMENTS 10,501,332 B2   12/2019  Scapens
2017/0067667 A1*  3/2017  Choi ................. F24S 60/10

FOREIGN PATENT DOCUMENTS

JP      2019-536720 A   12/2019
KR      10-1969297 B1    4/2019

* cited by examiner

*Primary Examiner* — Steven B McAllister
*Assistant Examiner* — John E Bargero
(74) *Attorney, Agent, or Firm* — Birch, Stewart, Kolasch & Birch, LLP

(57) ABSTRACT

Discussed is a heat transmitting system for providing a heat medium with a set temperature, the system comprises a heat source, a plurality of heat storage tanks, a heat exchanger, a heat source pump, an inlet side-heat source header, a heat source header valve, an outlet side-heat source header, an outlet valve of heat storage tank, a header outlet valve, a heat transmitting line, a heat transmitting pump, a temperature sensor of heat storage tank, and a controller conducting a heat storage mode for a heat storage tank whose temperature is the set temperature or below. During the heat storage mode, the controller operates the heat source pump, controlling the specific heat storage tank to store heat, and during the heat transmission mode, the controller suspends the operation of the heat source pump, controlling the heat medium inside the specific heat storage tank to be transmitted to the heat exchanger.

7 Claims, 10 Drawing Sheets

[FIG. 1]
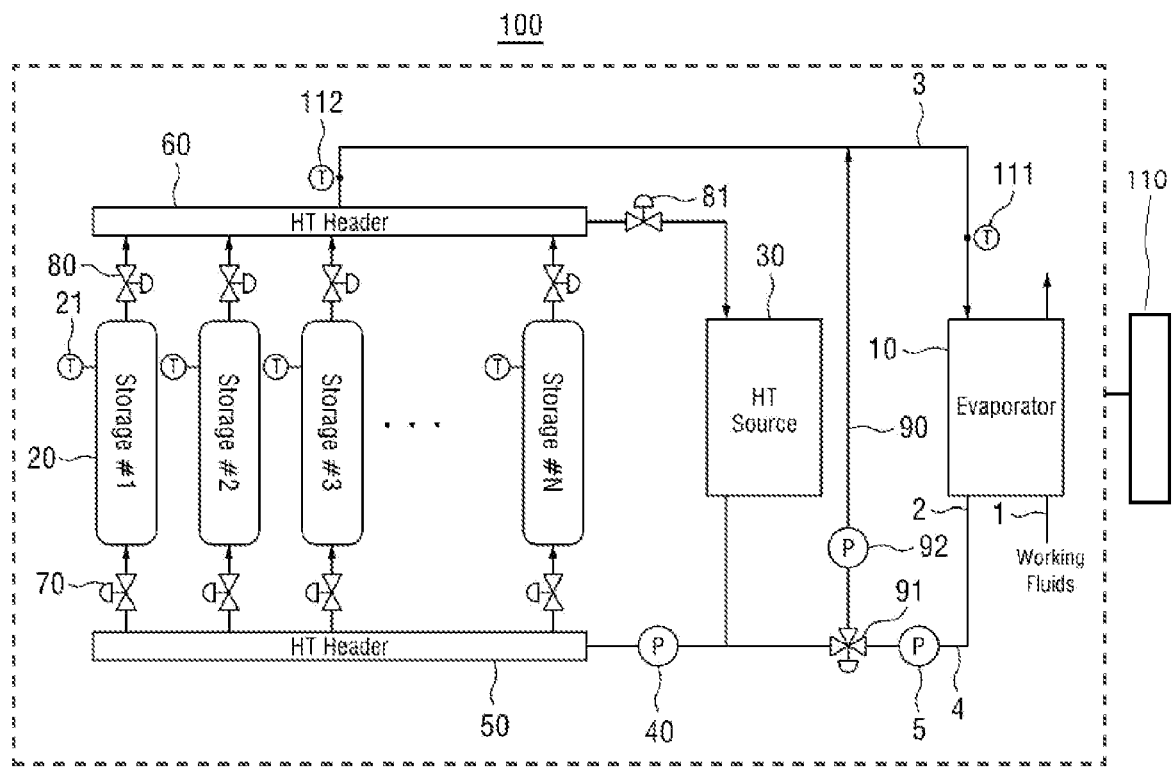

[FIG. 2]
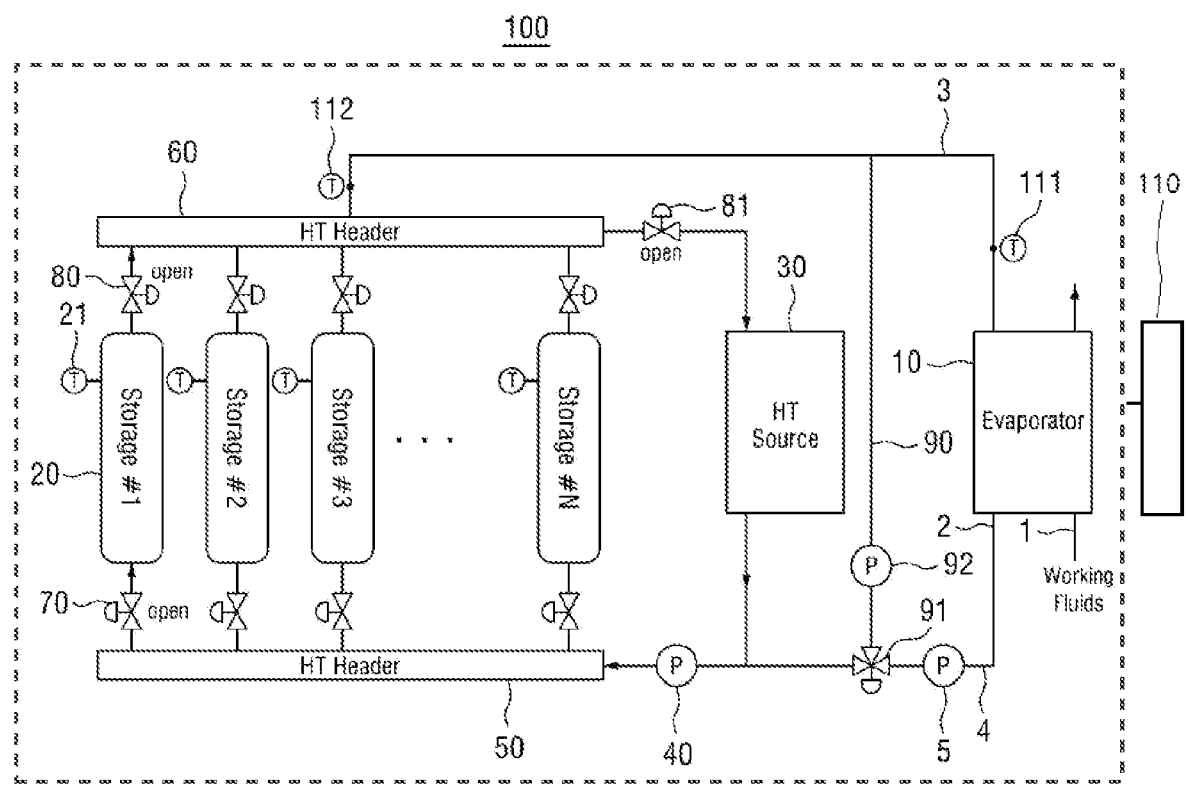

[FIG. 3]
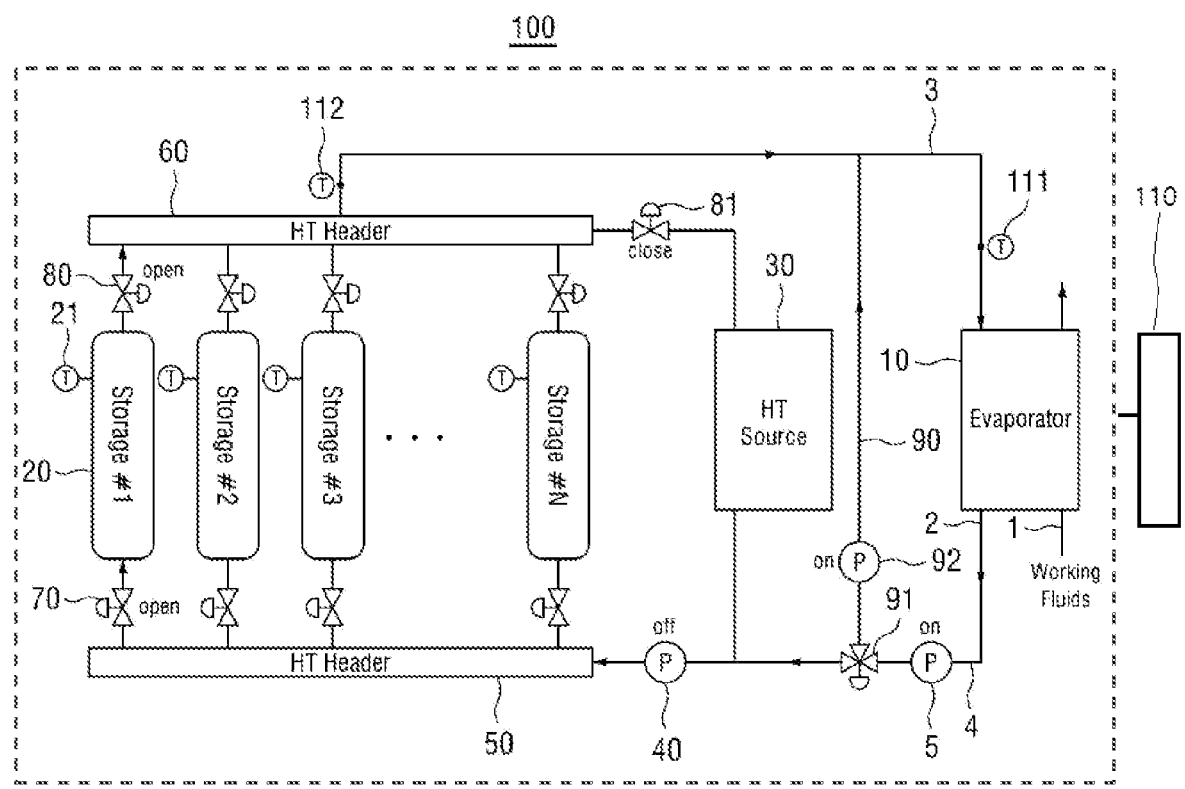

[FIG. 4]
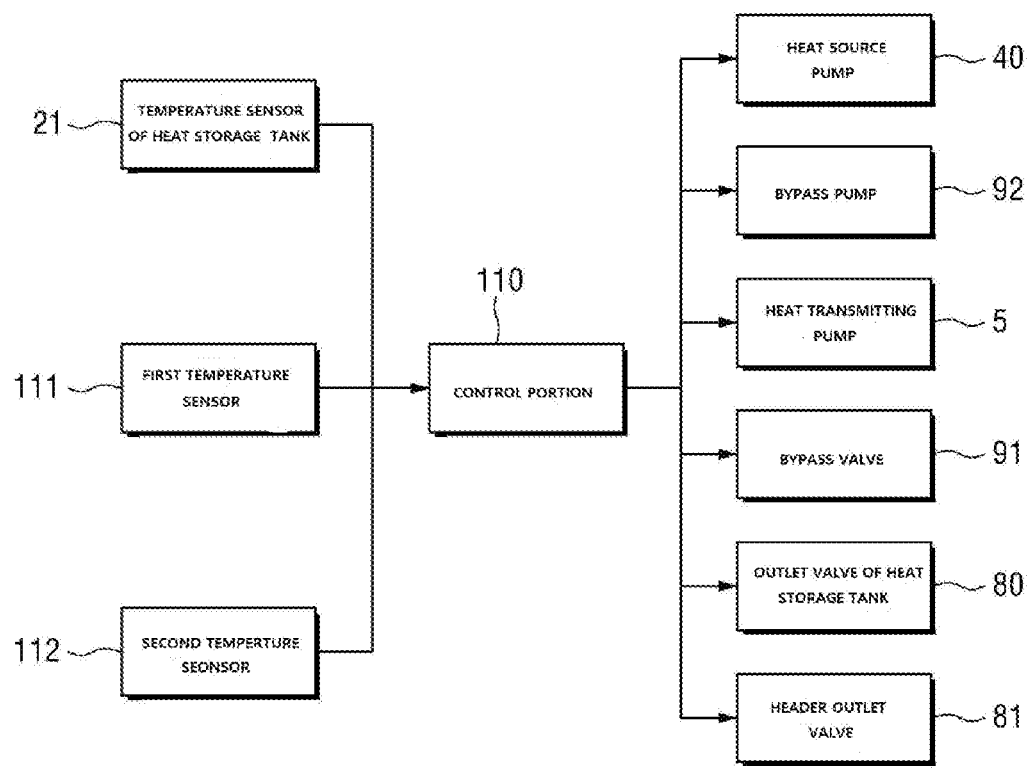

[FIG. 5A]
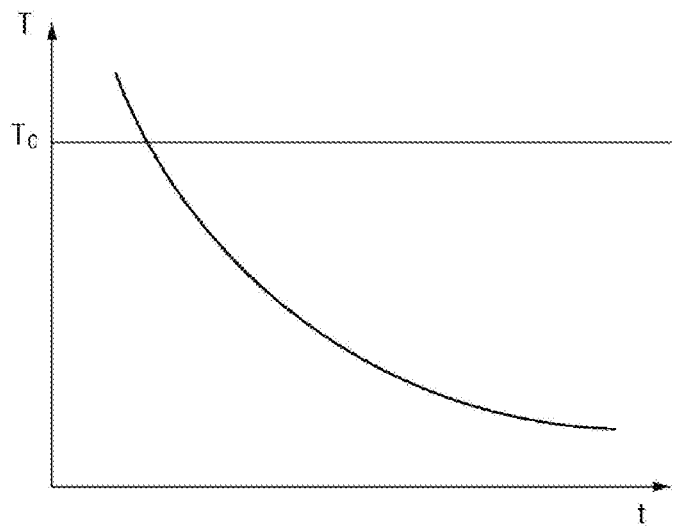
[FIG. 5B]
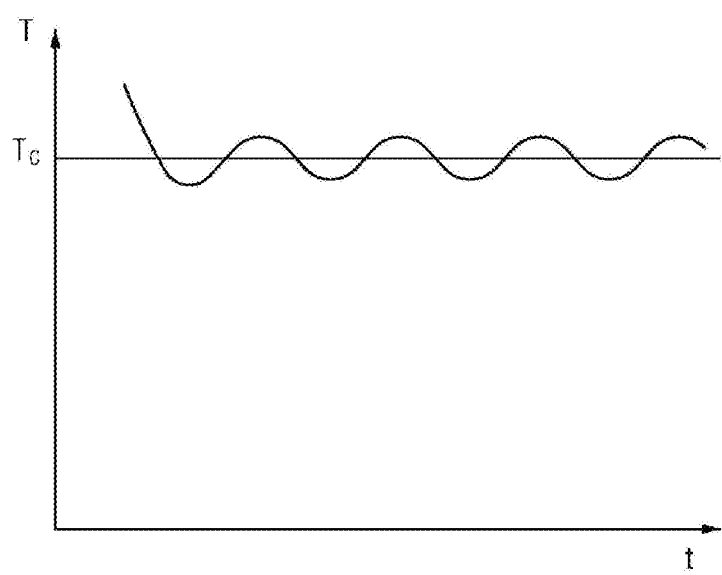

[FIG. 6]
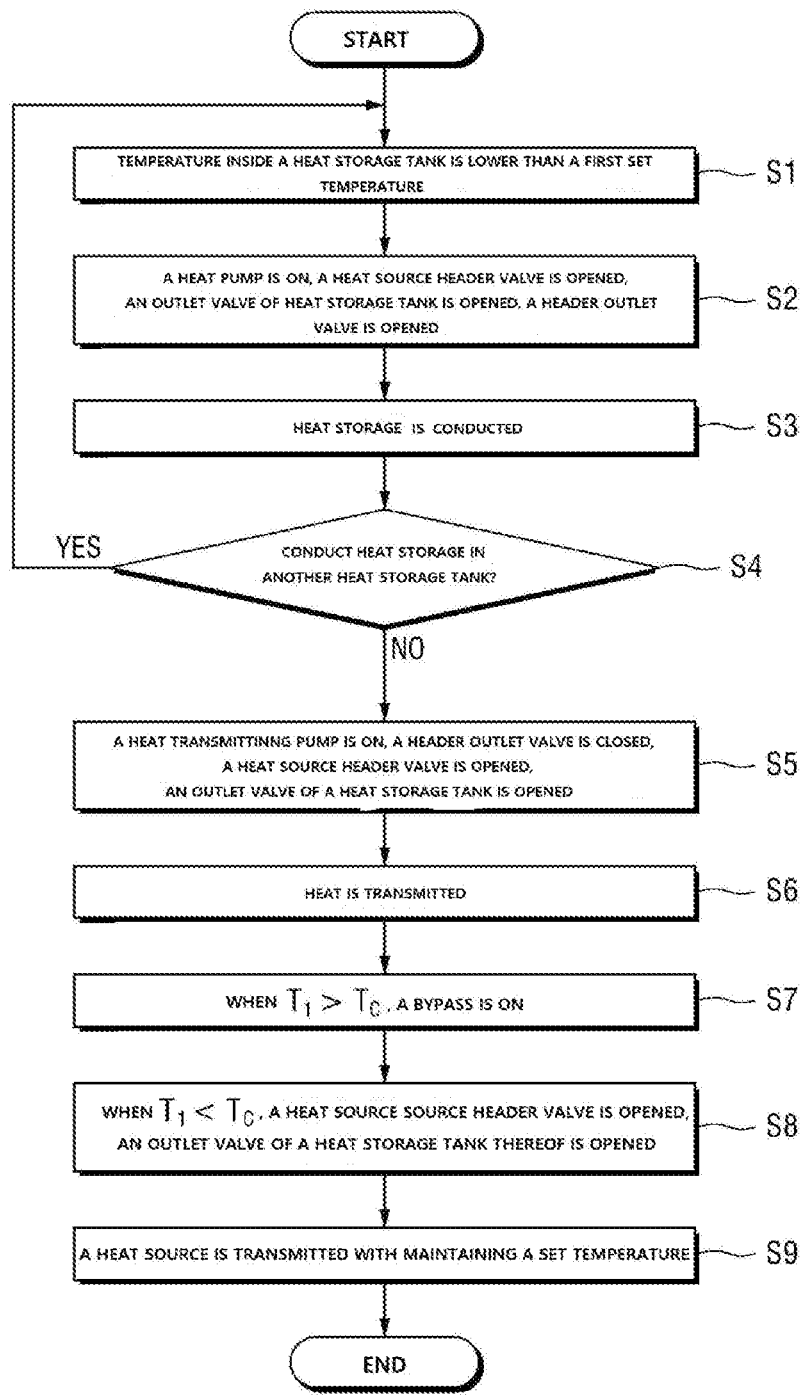

[FIG. 7]
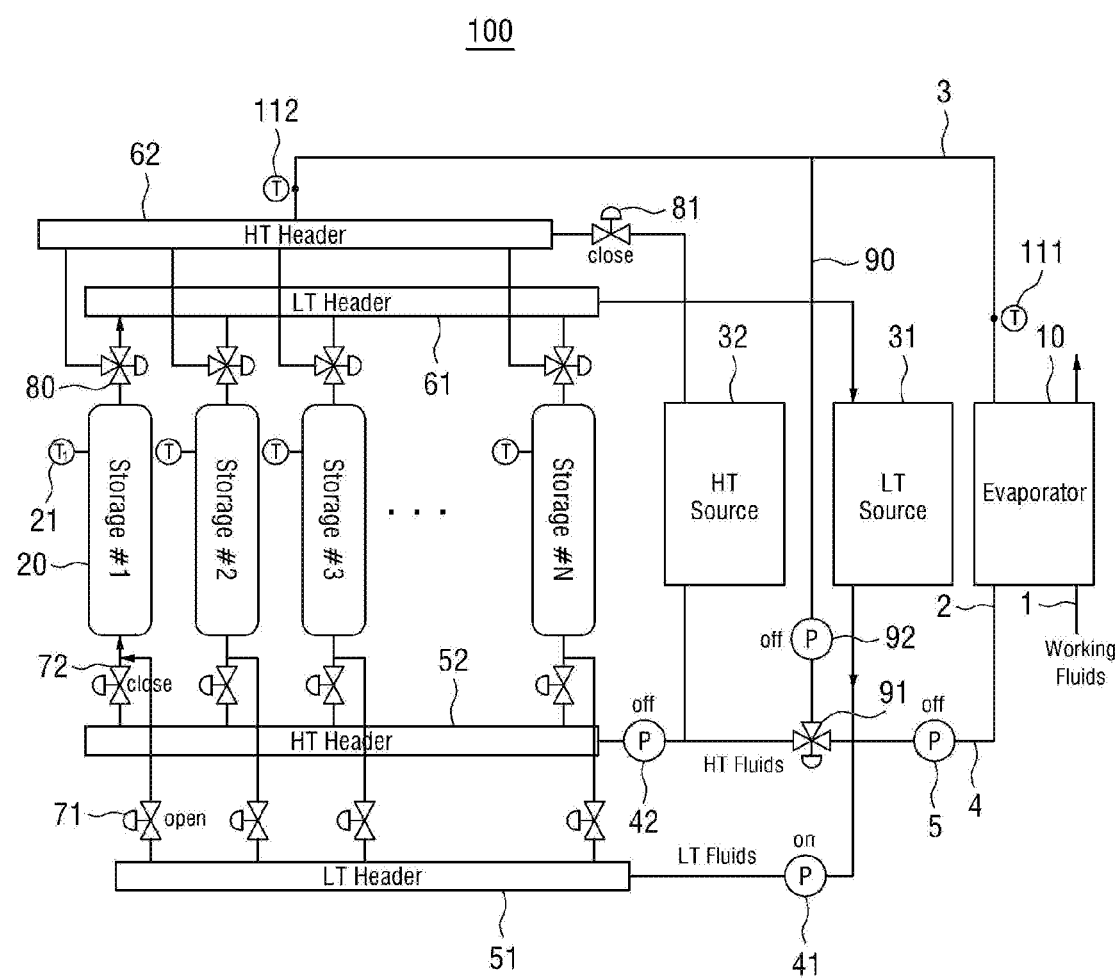

[FIG. 8]
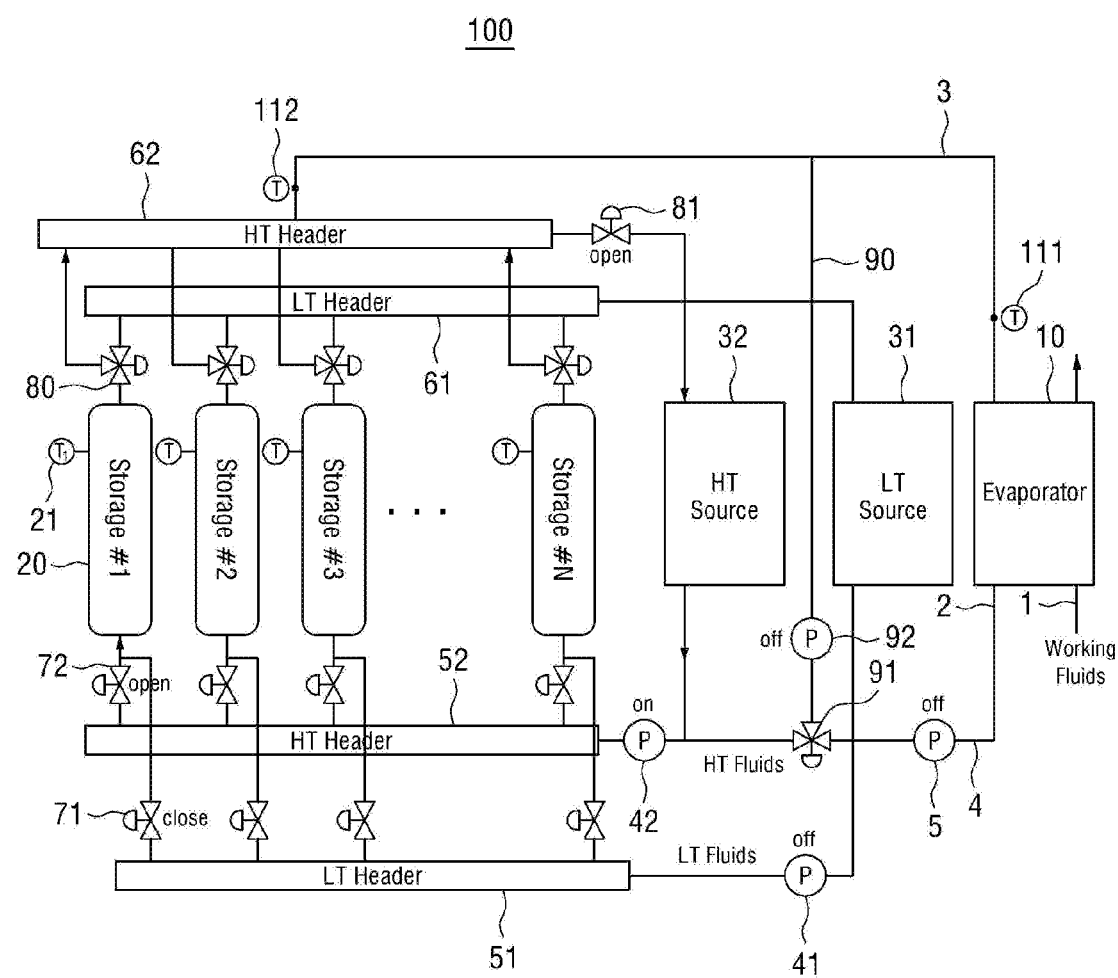

[FIG. 9]
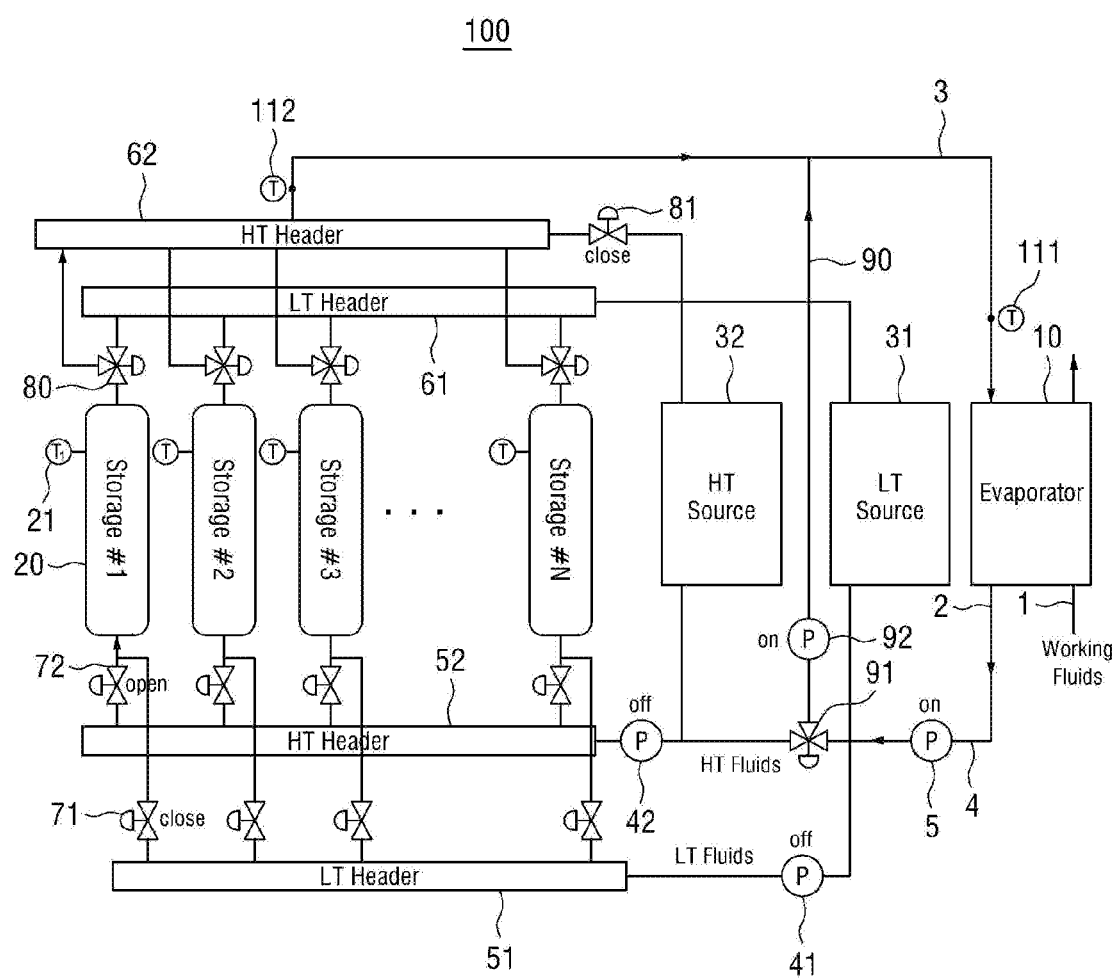

[FIG. 10]
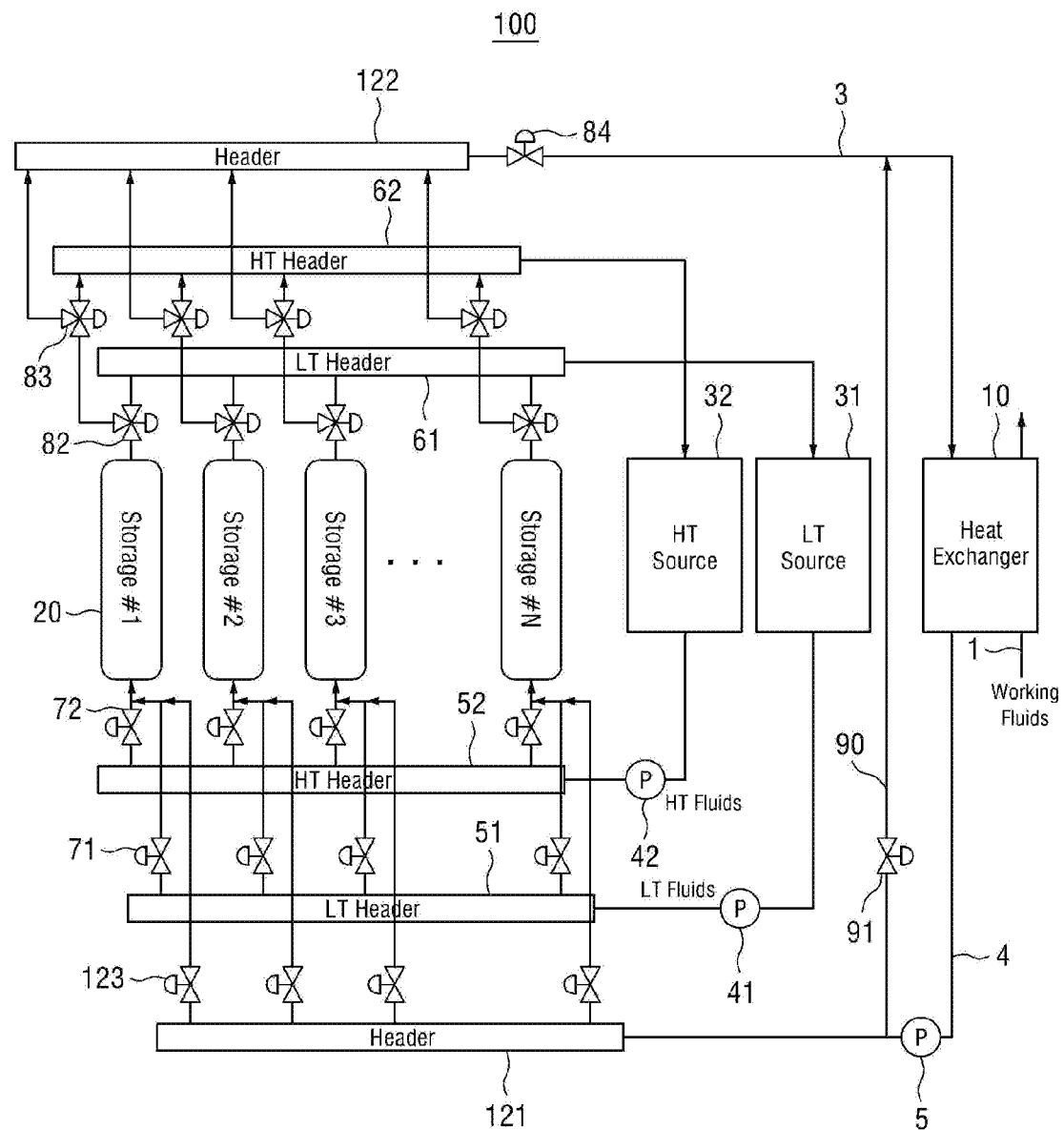

HEAT TRANSMITTING SYSTEM FOR PROVIDING A HEAT MEDIUM WITH A SET TEMPERATURE AND HEAT TRANSMITTING METHOD

CROSS-REFERENCE TO RELATED APPLICATIONS

This application claims priority to and the benefit of Korea Patent Application No. 10-2019-0115588 filed in the Korean Intellectual Property Office on Sep. 19, 2019, the contents of which are incorporated herein by reference in their entirety.

BACKGROUND

Technical Field

The present invention is related to a heat transmitting system for providing a heat medium with a set temperature and a heat transmitting method.

Related Art

The general organic rankine cycle is configured to include a pump that discharges a working fluid, an evaporator to which heat is transmitted from a heat medium and then which evaporates the working fluid discharged from the pump, an expander into which the evaporated gas is introduced and which expands the introduced gas, a generator that generates electricity through a rotation force of this expander and a condenser that condenses the working fluid discharged from the generator. In addition, an expander inlet valve is provided at the front end of the expander and an expander outlet valve is provided at the rear end thereof.

Currently, researches for one of such generator cycles, the organic rankine cycle for connecting various unutilized heats as a heat source complexly and utilizing the same have been made actively.

However, various unutilized heat sources, such as solar heat, sewage heat, et cetera have respective different temperatures and outputs thereof according to time are irregular.

In order to use these various heat sources at the need arises, a heat storage apparatus is required to store heat when consumption thereof is low, then utilizing the stored heat.

Generally, in order to store heat sources with respective different temperatures, the respective heat sources should have separate heat storage apparatuses, and it is allowed to produce heat with a temperature corresponding to the temperature of the respective heat sources only.

Further, when recovering and using heat from the heat storage apparatus, a temperature of a tank is lowered according to time. That is, the temperature of the transmitted heat source is not uniform.

Therefore, demanded is a technique that links multiple heat storage apparatuses so as to store heat sources with different temperatures, and produces a heat medium with a set temperature at the need arises.

RELATED ART DOCUMENT

Patent Document (Patent Document 0001) Korean Patent No. 10-1969297
(Patent Document 0002) Japanese Laid-open Publication No. 2019-536720

SUMMARY

Technical Problem

Therefore, the present disclosure is provided to overcome conventional problems as described above. According to the embodiment of the present disclosure, it is aimed to provide a heat transmitting system for providing a heat medium with a set temperature and a heat transmitting method which link multiple heat storage apparatuses and store heat sources with different temperatures and which provides a heat medium with a set temperature at the need arises.

Meanwhile, technical objects to be achieved in the present invention are not limited to the aforementioned technical objects, and other technical objects, which are not mentioned above, will be apparently understood to a person having ordinary skill in the art from the following description.

Technical Solution

According to a first aspect of the present invention, a heat transmitting system for providing a heat medium with a set temperature, characterized in that a heat transmitting system may include: a heat source; a heat source; a plurality of heat storage tanks that stores heat media heated by the heat source respectively; a heat exchanger that is transmitted with heat from the heat media stored in the heat storage tanks; a heat source pump that transmits the heat media transmitted from the heat source to the heat storage tanks; an inlet side-heat source header that is connected with respective inlet ends of the plurality of heat storage tanks; a heat source header valve that is provided between the inlet side-heat source header and the respective inlet ends of the plurality of heat storage tanks; an outlet side-heat source header that is connected with respective outlet ends of the plurality of heat storage tanks; an outlet valve of heat storage tank that is provided to respective outlet ends of the plurality of heat storage tanks; a header outlet valve that is provided between the heat source and the outlet side-heat source header; a heat transmitting line that is connected between the outlet side-heat source header and an inlet end of the heat exchanger, thus transmitting the heat medium to the heat exchanger; and a heat transmitting pump that is provided to one side of an outlet line of the heat exchanger connecting the heat transmitting line or the heat exchanger and the inlet side-heat source header.

According to another aspect of the present invention, the heat transmitting system for providing a heat medium with a set temperature may include: a temperature sensor of heat storage tank that is provided to the respective heat storage tanks, thus measuring temperatures of the heat media inside the respective heat storage tanks; and a control portion that controls to conduct a heat storage mode for a heat storage tank of which temperature measured by the heat storage temperature sensor is a set temperature or below.

According to another aspect of the present invention, during the heat storage mode, the control portion operates the heat source pump, opens the header outlet valve, and also opens the outlet valve of heat storage tank and heat source header valve of a specific heat storage tank subjected to heat storage, thus controlling the specific heat storage tank to store heat.

According to another aspect of the present invention, when heat storage for the specific heat storage tank is completed, the control portion controls to conduct a heat storage mode for another heat storage tank of which temperature measured by the temperature sensor of heat storage tank is a set temperature or below.

According to another aspect of the present invention, during the heat transmission mode, the control portion suspends the operation of the heat source pump, closes the header outlet valve, operates the heat transmitting pump, and opens the outlet valve of heat storage tank and heat source header valve of a specific heat storage tank storing heat, thus controlling the heat medium inside the specific heat storage tank to be transmitted to the heat exchanger.

According to a second aspect of the present invention, the heat transmitting system for providing a heat medium with a set temperature may further includes: a temperature sensor that is provided in one side of the heat transmitting line and measures temperature of a heat medium introduced into the heat exchanger in real time; and when a value of the temperature measured in the temperature sensor drops below the specific range from a set value, the control portion opens the outlet valve of heat storage tank and heat source header valve of another heat storage tank besides the specific heat storage tank and transmits the heat medium inside the specific or another heat storage tank to the heat exchanger, thus controlling temperatures of the heat media transmitted to the heat exchanger to be maintained within the specific range.

According to another aspect of the present invention, the heat transmitting system for providing a heat medium with a set temperature may further include: a bypass valve that is provided in one side of the outlet line of heat exchanger; a bypass line that connects one side of the heat transmitting line and the bypass valve; and a bypass pump that is provided in one side of the bypass line.

According to another aspect of the present invention, when a value of the temperature measured in the temperature sensor exceeds the set temperature, the control portion operates the bypass pump and opens the bypass valve, thus allowing bypass of a part of heat media discharged from the heat exchanger to the heat transmitting line and controlling temperatures of the heat media to be maintained within the specific range.

According to second aspect of the present invention, a heat transmitting method for providing a heat medium with a set temperature with the heat transmitting system according to the second aspect of the present disclosure may include comprises the steps of: conducting a heat storage mode for a heat storage tank of which temperature measured by a temperature sensor of heat storage tank is a set temperature or below; operating a heat source pump, opening a header outlet valve and opening the outlet valve of heat storage tank and heat source header valve of a specific heat storage tank subjected to heat storage by a control portion; circulating and storing the heat medium transmitted with heat from a heat source in the specific heat storage tank; controlling to conduct a heat storage mode for another heat storage tank of which temperature by measured the temperature sensor of heat storage tank is a set temperature or below when heat storage for the specific heat storage tank is completed; suspending the operation of the heat source pump, closing the header outlet valve, operating the heat transmitting pump, and opening the outlet valve of heat storage tank and heat source header valve of a specific heat storage tank storing heat by the control portion, during the heat transmission mode; and transmitting the heat medium inside the specific heat storage tank to the heat exchanger.

According to another aspect of the present invention, the heat transmitting method for providing a heat medium with a set temperature may further include the step of measuring temperature of the heat medium introduced into the heat exchanger in real time by a temperature sensor that is provided in one side of the heat transmitting line, and when a value of the temperature measured in the temperature sensor drops below the specific range from a set value, the control portion opens the outlet valve of heat storage tank and heat source header valve of another heat storage tank besides the specific heat storage tank and transmits the heat medium inside the specific or another heat storage tank to the heat exchanger, thus controlling temperatures of the heat media transmitted to the heat exchanger to be maintained within the specific range.

According to another aspect of the present invention, the heat transmitting system may further include a bypass valve that is provided in one side of the outlet line of heat exchanger, a bypass line that connects one side of the heat transmitting line and the bypass valve and a bypass pump that is provided in one side of the bypass line, and when a value of the temperature measured in the temperature sensor exceeds the set temperature, the control portion operates the bypass pump and opens the bypass valve, thus allowing bypass of a part of heat media discharged from the heat exchanger to the heat transmitting line and controlling temperatures of the heat media to be maintained within the specific range.

According to third aspect of the present invention, a heat transmitting system for providing a heat medium with a set temperature, characterized in that a heat transmitting system may include: a first heat source; a second heat source having different temperature from that of the first heat source; a plurality of heat storage tanks that stores heat media heated by at least any one of the first heat source and the second heat source respectively; a heat exchanger that is transmitted with heat from the heat media stored in the heat storage tanks; a first heat source pump that transmits the heat media transmitted from the first heat source to the heat storage tanks; a second heat source pump that transmits the heat media transmitted from the second heat source to the heat storage tanks; a first inlet side-heat source header that is connected with the first heat source and respective inlet ends of the plurality of heat storage tanks; a second inlet side-heat source header that is connected with the second heat source and respective inlet ends of the plurality of heat storage tanks; a first heat source header valve that is provided between the first inlet side-heat source header and the respective inlet ends of the plurality of heat storage tanks; a second heat source header valve that is provided between the second inlet side-heat source header and the respective inlet ends of the plurality of heat storage tanks; a first outlet side-heat source header that is connected with respective outlet ends of the plurality of heat storage tanks; a second outlet side-heat source header that is connected with respective outlet ends of the plurality of heat storage tanks; a heat storage outlet valve that is provided to respective outlet ends of the plurality of heat storage tanks; a header outlet valve that is provided to at least one of between the first heat source and the first outlet side-heat source header and between the second heat source and the second outlet side-heat source header; a heat transmitting line that is connected between the second outlet side-heat source header and an inlet end of the heat exchanger, thus transmitting the heat medium to the heat exchanger; and a heat transmitting pump that is provided to one side of an outlet line of the heat exchanger connecting the heat transmitting line or the heat exchanger and the inlet side-heat source header.

According to another aspect of the present invention, the second heat source has temperature higher than the first heat source, and the heat transmitting system may include: a temperature sensor of heat storage tank that is provided to the respective heat storage tanks, thus measuring temperatures of the heat media inside the respective heat storage tanks; and a control portion that controls to conduct a heat storage mode for a heat storage tank of which temperature measured by the heat storage temperature sensor is a first set temperature or below or a second set temperature or below.

According to another aspect of the present invention, during the heat storage mode, the control portion operates the first heat source pump and controls the outlet valve of heat storage tank of a specific heat storage tank subjected to heat storage thus allowing the heat media of the heat storage tank to be introduced into the first outlet side-heat source header, and also opens the first heat source header valve thus controlling the specific heat storage tank to store heat by the first heat source, and when temperatures of the heat media exceed the first set temperature and are the second set temperature or below, the control portion operate the second heat source pump and controls the outlet valve of heat storage tank of the specific heat storage tank subjected to heat storage of the heat storage tank thus allowing the heat media to be introduced into the second outlet side-heat source header, and also opens the second heat source header valve thus controlling the specific heat storage tank to store heat by the second heat source.

According to another aspect of the present invention, when heat storage for the specific heat storage tank is completed, the control portion controls to conduct a heat storage mode for another heat storage tank of which temperature by measured the temperature sensor of heat storage tank is the first set temperature or below or the second set temperature or below.

According to fourth aspect of the present invention, a heat transmitting method for providing a heat medium with a set temperature with the heat transmitting system according to the third aspect of the present disclosure may include the steps of: conducting a heat storage mode for a heat storage tank of which temperature measured by a temperature sensor of heat storage tank is a first set temperature or below or a second set temperature or below; operating a first heat source pump, opening a header outlet valve and opening a first outlet valve of heat storage tank and a first heat source header valve of a specific heat storage tank subjected to heat storage by a control portion when a value of the temperature measured by the temperature sensor of heat storage tank is the first set temperature or below; circulating and storing the heat medium transmitted with heat from a first heat source in the specific heat storage tank; operating a second heat source pump, opening a header outlet valve and controlling the outlet valve of heat storage tank of a specific heat storage tank subjected to heat storage by a control portion thus allowing the heat media to be introduced into a second outlet side-heat source header, and also opening a second heat source header valve thus controlling the specific heat storage tank to store heat, when temperatures of the heat media exceed the first set temperature and are the second set temperature or below; controlling to conduct a heat storage mode for another heat storage tank of which temperature by measured the temperature sensor of heat storage tank is the first set temperature or below or the second set temperature or below by the control portion, when heat storage for the specific heat storage tank is completed; suspending the operation of the first heat source pump and the second heat source pump, closing the header outlet valve, operating the heat transmitting pump, and controlling the outlet valve of heat storage tank of a specific heat storage tank storing heat by the control portion and also opening the second heat source header valve, during the heat transmission mode; and transmitting the heat medium inside the specific heat storage tank to the heat exchanger.

According to fifth aspect of the present invention, a heat transmitting system for providing a heat medium with a set temperature, characterized in that a heat transmitting system may include: a heat source; a plurality of heat storage tanks that stores heat media heated by the heat source respectively; a heat exchanger that is transmitted with heat from the heat media stored in the heat storage tanks; a heat source pump that transmits the heat media transmitted from the heat source to the heat storage tanks; an inlet side-heat source header that is connected with respective inlet ends of the plurality of heat storage tanks; a heat source header valve that is provided between the inlet side-heat source header and the respective inlet ends of the plurality of heat storage tanks; an outlet side-heat source header that is connected with respective outlet ends of the plurality of heat storage tanks; a first outlet valve of heat storage tank that is provided to respective outlet ends of the plurality of heat storage tanks; an inlet side-transmitting header that is connected with the heat exchanger and the respective inlet ends of the plurality of heat storage tanks; an outlet side-transmitting header that is connected with the respective outlet ends of the plurality of heat storage tanks; a second outlet valve of heat storage tank that is provided between the respective outlet ends of the plurality of heat storage tanks and the outlet side-transmitting header; a heat transmitting line that is connected between the outlet side-transmitting header and an inlet end of the heat exchanger, thus transmitting the heat medium to the heat exchanger; a heat transmitting valve that is provided in one side of the heat transmitting line; and a heat transmitting pump that is provided to one side of an outlet line of the heat exchanger connecting the heat transmitting line or the heat exchanger and the inlet side-transmitting header.

According to another aspect of the present invention, during the heat transmission mode, the control portion opens the heat transmitting pump, opens the heat transmitting valve and controls the first outlet valve of heat storage tank and the second outlet valve of heat storage tank, thus controlling the heat medium inside the specific heat storage tank to be transmitted to the heat exchanger.

According to another aspect of the present invention, in the heat source transmitting state, when it is necessary to store heat in a specific heat storage tank, the control portion operates the heat source pump, opens the heat source header valve of a heat storage tank requiring heat storage and the first outlet valve of heat storage tank, thus controlling the specific heat storage tank to store heat.

Advantageous Effects

According to the embodiment of the present disclosure, a heat transmitting system for providing a heat medium with a set temperature and a heat transmitting method are capable of linking multiple heat storage apparatuses and storing heat sources with different temperatures, and providing a heat medium with a set temperature at the need arises.

Meanwhile, advantageous effects to be obtained in the present invention are not limited to the aforementioned effects, and other effects, which are not mentioned above, will be apparently understood to a person having ordinary skill in the art from the following description.

BRIEF DESCRIPTION OF THE DRAWINGS

The accompanying drawings of this specification exemplify a preferred embodiment of the present disclosure, the spirit of the present disclosure will be more clearly understood from the following detailed description taken in conjunction with the accompanying drawings, and thus it will be understood that the present disclosure is not limited to only contents illustrated in the accompanying drawings.

FIG. 1 is a configuration diagram of a heat transmitting system for providing a heat medium with a set temperature according to the first embodiment of present disclosure.

FIG. 2 is a configuration diagram of a heat transmitting system for providing a heat medium with a set temperature according to the first embodiment of present disclosure during the heat storage mode.

FIG. 3 is a configuration diagram of a heat transmitting system for providing heat with a set temperature according to the first embodiment of present disclosure during the heat transmission mode.

FIG. 4 is a block diagram showing signal flow of a control portion according to the first embodiment of the present disclosure.

FIG. 5A is a graph showing temperature of a heat source to be transmitted to a heat exchanger when transmitting heat for the conventional heat source.

FIG. 5B is a graph showing temperature of a heat source to be transmitted to a heat exchanger when transmitting heat according to the present disclosure.

FIG. 6 is a flowchart of a heat transmitting method for providing a heat medium with a set temperature according to the first embodiment of the present disclosure.

FIG. 7 is a configuration diagram of a heat transmitting system for providing a heat medium with a set temperature according to the second embodiment of present disclosure.

FIG. 8 is a configuration diagram of a heat transmitting system for providing a heat medium with a set temperature according to the second embodiment of present disclosure during the heat storage mode.

FIG. 9 is a configuration diagram of a heat transmitting system for providing a heat medium with a set temperature according to the second embodiment of present disclosure during the heat transmission mode.

FIG. 10 is a configuration diagram of a heat transmitting system for providing a heat medium with a set temperature according to the third embodiment of present disclosure.

DETAILED DESCRIPTION

Hereinafter, the aforementioned aims, other aims, features and advantageous effects of the present disclosure will be understood easily referring to preferable embodiments related to the accompanying drawings. However, the present disclosure is not limited embodiments described in this specification, and may be embodied into other forms. Preferably, the embodiments in this specification are provided in order to allow disclosed contents to be exhaustive and to communicate the concept of the present disclosure to those skilled in the art.

In this specification, when a certain element is placed on another element, this means that it may be formed directly thereon or that the third element may be interposed between them. Further, in the drawings, the thickness of an element may be overstated in order to explain the technical content thereof efficiently.

The embodiments described in this specification will explained with reference to a cross-sectional view and/or a plane view. In the drawings, the thickness of a film and a region may be overstated in order to explain the technical content thereof efficiently. Accordingly, the form of exemplary drawings for a fabrication method and/or an allowable error et cetera may be modified. Thus, the embodiments according to the present disclosure are not limited to specific forms illustrated herein, but may include variations in the form resulting from the fabrication method. For example, the region illustrated with perpendicular lines may have a form to be rounded or with a predetermined curvature. Thus, regions exemplified in the drawings have attributes, and shapes thereof exemplify specific forms rather than limiting the scope of the present disclosure. In the various embodiments of this specification, terms such as 'first' and 'second' et cetera are used to describe various elements, but these elements should not be limited to such terms. These terms are merely used to distinguish one element from others. The embodiments explained and exemplified herein may include complementary embodiments thereto.

The terms used in this specification is to explain the embodiments rather than limiting the present disclosure. In this specification, the singular expression includes the plural expression unless specifically stated otherwise. The term, such as 'comprise" does not preclude the potential existences of one or more elements.

When describing the following specific embodiments, various kinds of specific contents are made up to explain the present disclosure in detail and to help understanding thereof. However, it will be apparent for those who have knowledge to the extent of understanding the present disclosure that the present disclosure can be used without any of these specific contents. In a certain case when describing the present disclosure, the content that is commonly known to the public but is largely irrelevant to the present disclosure is not described in order to avoid confusion.

Hereinafter, a heat transmitting system for providing a heat medium with a set temperature 100 will be described. Firstly, configurations, functions and heat transmitting methods of the heat transmitting system for providing a heat medium with a set temperature 100 according to the first embodiment of the present disclosure will be described.

FIG. 1 is a configuration diagram of a heat transmitting system for providing a heat medium with a set temperature 100 according to the first embodiment of present disclosure. FIG. 2 is a configuration diagram of a heat transmitting system for providing a heat medium with a set temperature 100 according to the first embodiment of present disclosure during the heat storage mode. Further, FIG. 3 is a configuration diagram of a heat transmitting system for providing a heat medium with a set temperature 100 according to the first embodiment of present disclosure during the heat transmission mode.

FIG. 4 is a block diagram showing signal flow of a control portion 110 according to the first embodiment of the present disclosure. FIG. 5A is a graph showing temperature of a heat source to be transmitted to a heat exchanger 10 when transmitting heat for the conventional heat source. Further, FIG. 5B is a graph showing temperature of a heat source to be transmitted to a heat exchanger 10 when transmitting heat according to the present disclosure. FIG. 6 is a flowchart of a heat transmitting method for providing a heat medium with a set temperature according to the first embodiment of the present disclosure.

As shown in FIG. 1 to FIG. 3, the control portion 110 according to the first embodiment of the present disclosure is configured to include a heat source 30, a plurality of heat storage tanks 20, a heat exchanger 10, a heat source pump 40, an inlet side-heat source header 50, a heat source header valve 70, an outlet side-heat source header 60, an outlet valve of heat storage tank 80, a header outlet valve 81, a heat transmitting line 3, a heat transmitting pump 5, et cetera.

There is no restriction in the types of a heat source to be applicable in the first embodiment of the present disclosure. Each of the plurality of heat storage tanks 20 is configured to store a heat medium 2 that is heated by the heat source 30.

In addition, the heat exchanger 10 is configured to be transmitted with heat from the heat medium 2 stored in the heat storage tank 20 then transmitting the same to a working fluid 1. The heat source pump 40 transmits the heat medium transmitted from the heat source 30 to the heat storage tank 20.

The inlet side-heat source header 50 is connected with is connected with respective inlet ends of the plurality of heat storage tanks 20 and is also connected with an outlet line of heat exchanger 4.

The heat source header valve 70 is provided between the inlet side-heat source header 50 and the respective inlet ends of the plurality of heat storage tanks 20. Further, the outlet side-heat source header 60 is connected with respective outlet ends of the plurality of heat storage tanks 20 and this is also connected to a heat transmitting line 3.

The outlet valve of heat storage tank 80 is provided to respective outlet ends of the plurality of heat storage tanks 20 and is connected with the outlet side-heat source header 60. Further, the header outlet valve 81 is provided between the heat source 30 and the outlet side-heat source header 60.

The heat transmitting line 3 is connected between the outlet side-heat source header 60 and an inlet end of the heat exchanger 10, thus being configured to transmit the heat medium to the heat exchanger 10.

The heat transmitting pump 5 is provided to one side of an outlet line of heat exchanger connecting the heat exchanger 10 and the inlet side-heat source header 50.

In addition, a temperature sensor of heat storage tank 21 is provided to the respective heat storage tanks 20, thus being configured to measure temperatures of the heat media inside the respective heat storage tanks 20.

Further, the control portion 110 controls to conduct a heat storage mode for the heat storage tank 20 of which temperature measured by the heat storage temperature sensor 21 is a set temperature or below (51).

As shown in FIG. 2, during the heat storage mode, the control portion 110 operates the heat source pump 40, opens the header outlet valve 81, and also opens the outlet valve of heat storage tank 80 and heat source header valve 70 of a specific heat storage tank 20 subjected to heat storage, thus controlling the specific heat storage tank 20 to store heat (S2, S3).

Further, when heat storage for the specific heat storage tank 20 is completed, the control portion 110 controls to conduct a heat storage mode for another heat storage tank 20 of which temperature measured by the temperature sensor of heat storage tank 21 is a set temperature or below (54).

In addition, as shown in FIG. 3, during the heat transmission mode, the control portion 110 suspends the operation of the heat source pump 40, closes the header outlet valve 81, operates the heat transmitting pump 5 (S5).

Further, this opens the outlet valve of heat storage tank 80 and heat source header valve 70 of a specific heat storage tank 20 storing heat, thus controlling the heat medium inside the specific heat storage tank 20 to be transmitted to the heat exchanger 10 (S6).

As shown in FIG. 5A, when heat is transmitted to the heat exchanger 10 by a heat medium of this heat storage tank 20, temperatures of the heat media inside the heat storage tanks 20 drop below as time passes by, thus temperature of the heat transmitted to the heat exchanger 10 also drops below.

In the first embodiment of the present disclosure, a temperature sensor 111 is provided in one side of the heat transmitting line 3 and measures temperature of a heat medium introduced into the heat exchanger 10 in real time.

In addition, when a value of the temperature measured in the temperature sensor 111 drops below the specific range from a set value, as shown in FIG. 5A, the control portion 110 opens the outlet valve of heat storage tank 80 and heat source header valve 70 of another heat storage tank 20 besides the specific heat storage tank 20 and transmits the heat medium inside another heat storage tank 20 to the heat exchanger 10, thus controlling temperatures of the heat media transmitted to the heat exchanger 10 to be maintained within the specific range (S8).

Further, as shown in FIG. 1 to FIG. 3, the first embodiment of the present disclosure is configured to comprise a bypass valve 91 that is provided in one side of the outlet line of heat exchanger 4, a bypass line 90 that connects one side of the heat transmitting line 3 and the bypass valve 91 and a bypass pump 92 that is provided in one side of the bypass line 90.

Thus, when a value of the temperature measured in the temperature sensor 111 exceeds the set temperature, the control portion 110 operates the bypass pump 92 and opens the bypass valve 91, thus allowing bypass of a part of the heat media discharged from the heat exchanger 10 to the heat transmitting line 3 and controlling temperatures of the heat media to be maintained within the specific range as shown in FIG. 5B (S7).

Hereinafter, configurations and features of a heat transmitting system for providing a heat medium with a set temperature according to the second embodiment of the present disclosure will be described. A heat transmitting system for providing a heat medium with a set temperature 100 according to the second embodiment of the present disclosure has similar configurations to the aforementioned first embodiment. The heat transmission mode is the same as the first embodiment, but is different therefrom in using two heat sources. In the second embodiment, it is illustrated to apply two heat sources, however, there is no restriction to the number of the heat source.

FIG. 7 a configuration diagram of a heat transmitting system for providing a heat medium with a set temperature 100 according to the second embodiment of present disclosure during the heat storage mode by the first heat source. In addition, FIG. 8 a configuration diagram of a heat transmitting system for providing a heat medium with a set temperature 100 according to the second embodiment of present disclosure during the heat storage mode by the second heat source. Further, FIG. 9 is a configuration diagram of a heat transmitting system for providing a heat medium with a set temperature 100 according to the second embodiment of present disclosure during the heat transmission mode.

The second embodiment of the present disclosure includes a first heat source 31, a second heat source 32 that has a different temperature from that of the first heat source 31. In a specific embodiment, the second heat source 32 has a higher temperature than that of the first heat source 31.

In addition, respective heat storage tanks 20 are configured to store heat media heated by at least any one of the first heat source 31 and the second heat source 32. Further, a heat exchanger 10 is configured to be transmitted with heat from the heat media stored in the heat storage tanks 20.

Further, this includes a first heat source pump 14 that transmits the heat media transmitted from the first heat source 31 to the heat storage tanks 20 and a second heat source pump 42 that transmits the heat media transmitted from the second heat source 32 to the heat storage tanks 20.

In addition, this is configured to include a first inlet side-heat source header 51 that is connected with the first heat source 31 and respective inlet ends of the plurality of heat storage tanks 20, and a second inlet side-heat source header 52 that is connected with the second heat source 32 and respective inlet ends of the plurality of heat storage tanks 20.

Further, a first heat source header valve 71 is provided between the first inlet side-heat source header 51 and the respective inlet ends of the plurality of heat storage tanks 20. A second heat source header valve 72 is provided between the second inlet side-heat source header 51 and the respective inlet ends of the plurality of heat storage tanks 20.

In addition, a first outlet side-heat source header 61 is connected with respective outlet ends of the plurality of heat storage tanks 20.

Further, a second outlet side-heat source header 62 is connected with respective outlet ends of the plurality of heat storage tanks 20. This connected with a heat transmitting pipe 3 and is also connected with the second heat source 32.

In addition, a heat storage outlet valve 80 is provided to respective outlet ends of the plurality of heat storage tanks 20. In the second embodiment, this outlet valve of heat storage tank 80 is configured as a three-way valve, thus transmitting the heat media inside the heat storage tanks 20 to the first outlet side-heat source header 61 or the second outlet side-heat source 62.

Further, a header outlet valve 81 is provided in one side of a pipe that connects the second heat source 32 and the second outlet side-heat source header 62.

In addition, a heat transmitting line 3 is connected between the second outlet side-heat source header 62 and an inlet end of the heat exchanger 10, thus transmitting the heat medium to the heat exchanger 10.

A heat transmitting pump 5 is provided to one side of an outlet line of heat exchanger 4 connecting the heat exchanger 10 and the second inlet side-heat source header 52. As described above, temperature of the second heat source 32 is higher than that of the first heat source 31. A temperature sensor of heat storage tank 21 is provided to the respective heat storage tanks 20, thus being configured to measure temperatures of the heat media inside the respective heat storage tanks 20.

In addition, a control portion 110 controls to conduct a heat storage mode for a heat storage tank 20 of which temperature measured by the heat storage temperature sensor 21 is a first set temperature or below or a second set temperature or below.

When temperature of the heat storage tank 20 is the first set temperature or below, as shown in FIG. 7, the control portion 110 operates the first heat source pump 41 and controls the outlet valve of heat storage tank 80 of a specific heat storage tank 20 subjected to heat storage thus allowing the heat media of the heat storage tank 20 to be introduced into the first outlet side-heat source header 61, and also opens the first heat source header valve 71 thus controlling the specific heat storage tank 20 to store heat by the first heat source 31.

In addition, when temperatures of the heat media inside the heat storage tank 20 exceed the first set temperature and is the second set temperature or below, as shown in FIG. 8, the control portion 110 operate the second heat source pump 42 and controls the outlet valve of heat storage tank 80 of the specific heat storage tank 20 subjected to heat storage thus allowing the heat media of the heat storage tank 20 to be introduced into the second outlet side-heat source header 62, and also opens the second heat source header valve 72 thus controlling the specific heat storage tank 20 to store heat by the second heat source 32.

In addition, when heat storage for the specific heat storage tank 20 is completed, the control portion 110 controls to conduct a heat storage mode for another heat storage tank 20 of which temperature by measured the temperature sensor of heat storage tank 21 is the first set temperature or below or the second set temperature or below.

The heat transmission mode is principally the same as the aforementioned first embodiment. As shown in FIG. 9, the control portion 110 suspends the operation of the first heat source pump 41 and the second heat source pump 42, closes the header outlet valve 81, operates the heat transmitting pump 5.

In addition, this controls the outlet valve of heat storage tank 80 of a specific heat storage tank 20 subjected to heat storage and also controls the second heat source header valve 72 to be opened. Thus, it is allowable to transmit a heat medium of the specific heat storage tank 20 to the heat exchanger 10.

Like the first embodiment, when a value of the temperature measured in the temperature sensor 111 drops below the specific range from a set value, the control portion 110 opens the outlet valve of heat storage tank 80 and heat source header valve 72 of another heat storage tank 20 besides the specific heat storage tank 20 and transmits the heat medium inside the specific or another heat storage tank 20 to the heat exchanger 10, thus controlling temperatures of the heat media transmitted to the heat exchanger 10 to be maintained within the specific range.

Further, when a value of the temperature measured in the temperature sensor 111 exceeds the set temperature, the control portion 110 operates the bypass pump 92 and opens the bypass valve 91, thus allowing bypass of a part of the heat media discharged from the heat exchanger 10 to the heat transmitting line 3 and controlling temperatures of the heat media to be maintained within the specific range.

Hereinafter, configurations and features of a heat transmitting system for providing a heat medium with a set temperature according to the third embodiment of the present disclosure will be described. FIG. 10 is a configuration diagram of a heat transmitting system for providing a heat medium with a set temperature 100 according to the third embodiment of present disclosure.

As shown in FIG. 10, the configuration of the third embodiment is principally similar to that of the aforementioned second embodiment, however, this is configured to include an inlet side-transmitting header 121, an outlet side-transmitting header 122, a heat transmitting valve 123, an outlet valve of heat storage tank 80 made up of a first outlet valve of heat storage tank 82 and a second outlet valve of heat storage tank 83, and a transmitting valve 84, thus conducting the heat storage mode for heat storage tanks 20 which are not transmitted with heat while conducting the heat transmission mode.

As compared to the second embodiment, in the heat transmitting system for providing a heat medium with a set temperature 100 according to the third embodiment, as shown in FIG. 10, a plurality of heat storage tanks 20 is provided to respective outlet ends and is configured to include a first outlet valve of heat storage tank 82 that is made up of a three-way valve, and a second outlet valve of heat storage tank 83 that is provided between respective outlet ends of the plurality of heat storage tanks 20 and the outlet side-transmitting header 122.

Further, the third embodiment is configured to further include the inlet side-transmitting header 121 that is connected with a heat exchanger 10 and the respective inlet ends of the plurality of heat storage tanks 20, and the outlet side-transmitting header 122 that is connected with the respective outlet ends of the plurality of heat storage tanks 20.

In addition, a heat transmitting line 3 is connected between the outlet side-transmitting header 122 and an inlet end of the heat exchanger 10, thus being configured to transmit a heat medium to the heat exchanger 10. Further, a transmitting valve 84 is provided in one side of the heat transmitting line 3.

Thus, during the heat storage mode according to the third embodiment, a control portion 110 opens a heat transmitting pump 5, opens the heat transmitting valve 123 of a specific heat storage tank 20 storing heat, and controls the first outlet valve of heat storage tank 82 and the second outlet valve of heat storage tank 83, thus controlling the heat medium inside the specific heat storage tank 20 to be transmitted to the heat exchanger 10 through the outlet side-transmitting header 122.

In the heat source transmitting state, when it is necessary to store heat in a specific heat storage tank 20 and when temperature of the specific heat storage tank 20 is a first set temperature or below, the control portion 110 according to the third embodiment of the present disclosure operates the first heat source pump 41, opens the first heat source header valve 71 of a heat storage tank 20 requiring heat storage and the first outlet valve of heat storage tank, and controls the first outlet valve of heat storage tank 82, thus controlling the specific heat storage tank 20 to store heat.

In addition, when temperature of the specific heat storage tank 20 exceeds a first set temperature and is a second set temperature or below, the control portion 110 operates the second heat source pump 42, opens the second heat source valve 72 of a heat storage tank requiring heat storage, and controls the first outlet valve of heat storage tank 82 and the second outlet valve of heat storage tank 83, thus controlling the specific heat storage tank 20 to store heat.

Further, the configuration and method of the embodiments as described above are not restrictively applied to the aforementioned apparatus and method. The whole or part of the respective embodiments may be selectively combined so as to make various modifications of the embodiments.

FIGURE REFERENCE NUMBERS

1: a working fluid
2: a heat medium
3: a heat transmitting line
4: an outlet line of heat exchanger
5: a heat transmitting pump
10: a heat exchanger
20: a heat storage tank
21: a temperature sensor of heat storage tank
30: a heat source
31: a first heat source
32: a second heat source
40: a heat source pump
41: a first heat source pump
42: a second heat source pump
50: an inlet side-heat source header
51: a first inlet side-heat source header
52: a second inlet side-heat source header
60: an outlet side-heat source header
61: a first outlet side-heat source header
62: a second outlet side-heat source header
70: a heat source header valve
71: a first heat source header valve
72: a second heat source header valve
80: an outlet valve of heat storage tank
81: a header outlet valve
82: a first outlet valve of heat storage tank
83: a second outlet valve of heat storage tank
84: a transmitting valve
90: a bypass line
91: a bypass valve
92: a bypass pump
100: a heat transmitting system for providing a heat medium with a set temperature
110: a control portion
111: a temperature sensor
121: an inlet side-transmitting header
122: an outlet side-transmitting header
123: a heat transmitting valve

The invention claimed is:

1. A heat transmitting system for providing a heat medium with a set temperature, the heat transmitting system comprising:
a heat source;
a plurality of heat storage tanks that stores heat media heated by the heat source respectively;
a heat exchanger that is transmitted with heat from the heat media stored in the plurality of heat storage tanks;
a heat source pump that transmits the heat media transmitted from the heat source to the plurality of heat storage tanks;
an inlet side-heat source header that is connected with respective inlet ends of the plurality of heat storage tanks;
a heat source header valve that is provided between the inlet side-heat source header and the respective inlet ends of the plurality of heat storage tanks;
an outlet side-heat source header that is connected with respective outlet ends of the plurality of heat storage tanks;
an outlet valve of heat storage tank that is provided to the respective outlet ends of the plurality of heat storage tanks;
a header outlet valve that is provided between the heat source and the outlet side-heat source header;
a heat transmitting line that is connected between the outlet side-heat source header and an inlet end of the heat exchanger, thus transmitting the heat medium to the heat exchanger;
a heat transmitting pump that is provided to one side of an outlet line of heat exchanger connecting the heat transmitting line or the heat exchanger and the inlet side-heat source header; and
a temperature sensor of heat storage tank that is provided to respective heat storage tanks, thus measuring temperatures of the heat media inside the respective heat storage tanks,
wherein a heat storage mode is conducted for a heat storage tank of which temperature measured by the heat storage temperature sensor is the set temperature or below,
wherein during the heat storage mode, the heat source pump is operated, the header outlet valve is opened, and an outlet valve of heat storage tank and a heat source header valve of a specific heat storage tank subjected to heat storage are opened, thus controlling the specific heat storage tank to store heat, wherein when the heat storage for the specific heat storage tank is completed, a heat storage mode is conducted for a different heat storage tank of which the temperature by measured the temperature sensor of heat storage tank is the set temperature or below, and wherein during the heat transmission mode, the operation of the heat source pump is suspended, the header outlet valve is closed, the heat transmitting pump is operated, and the outlet valve of heat storage tank and the heat source header valve of the specific heat storage tank storing heat are opened, thus controlling the heat medium inside the specific heat storage tank to be transmitted to the heat exchanger.

2. The heat transmitting system for providing a heat medium with a set temperature according to claim 1, further comprising: a temperature sensor that is provided in one side of the heat transmitting line and measures temperature of the heat medium introduced into the heat exchanger in real time, wherein when a value of the temperature measured in the temperature sensor drops below a specific range from a set value, an outlet valve of heat storage tank and a heat source header valve of the different heat storage tank besides the specific heat storage tank are opened and the heat medium inside the specific or the different heat storage tank is transmitted to the heat exchanger, thus controlling the temperatures of the heat media transmitted to the heat exchanger to be maintained within the specific range.

3. The heat transmitting system for providing a heat medium with a set temperature according to claim 2, further comprising:

a bypass valve that is provided in the one side of the outlet line of heat exchanger;

a bypass line that connects the one side of the heat transmitting line and the bypass valve; and a bypass pump that is provided in one side of the bypass line.

4. The heat transmitting system for providing a heat medium with a set temperature according to claim 3, wherein:

when the value of the temperature measured in the temperature sensor exceeds the set temperature, the bypass pump is operated and the bypass valve is opened, thus allowing bypass of a part of the heat media discharged from the heat exchanger to the heat transmitting line and controlling the temperatures of the heat media to be maintained within the specific range.

5. A heat transmitting method for providing a heat medium with a set temperature with the heat transmitting system according to claim 1, wherein the heat transmitting method comprises:

conducting the heat storage mode for the heat storage tank of which temperature measured by the temperature sensor of heat storage tank is the set temperature or below;

operating the heat source pump, opening the header outlet valve and opening the outlet valve of heat storage tank and the heat source header valve of the specific heat storage tank subjected to heat storage;

circulating and storing the heat medium transmitted with heat from the heat source in the specific heat storage tank;

controlling to conduct the heat storage mode for the different heat storage tank of which temperature by measured the temperature sensor of heat storage tank is the set temperature or below when the heat storage for the specific heat storage tank is completed;

suspending the operation of the heat source pump, closing the header outlet valve, operating the heat transmitting pump, and opening the outlet valve of heat storage tank and the heat source header valve of the specific heat storage tank storing heat, during the heat transmission mode; and transmitting the heat medium inside the specific heat storage tank to the heat exchanger.

6. The heat transmitting method for providing a heat medium with a set temperature according to claim 5, wherein the heat transmitting method further comprises measuring temperature of the heat medium introduced into the heat exchanger in real time by a temperature sensor that is provided in one side of the heat transmitting line, and when a value of the temperature measured in the temperature sensor drops below a specific range from a set value, an outlet valve of heat storage tank and a heat source header valve of the different heat storage tank besides the specific heat storage tank are opened and the heat medium inside the specific or the different heat storage tank is transmitted to the heat exchanger, thus controlling the temperatures of the heat media transmitted to the heat exchanger to be maintained within the specific range.

7. The heat transmitting method for providing a heat medium with a set temperature according to claim 6, wherein the heat transmitting system further comprises a bypass valve that is provided in the one side of the outlet line of heat exchanger, a bypass line that connects the one side of the heat transmitting line and the bypass valve and a bypass pump that is provided in one side of the bypass line, and when the value of the temperature measured in the temperature sensor exceeds the set temperature the bypass pump is operated and the bypass valve is opened, thus allowing bypass of a part of the heat media discharged from the heat exchanger to the heat transmitting line and controlling the temperatures of the heat media to be maintained within the specific range.

* * * * *